United States Patent
Hidaka

(10) Patent No.: US 7,430,161 B2
(45) Date of Patent: Sep. 30, 2008

(54) CROSS-CONNECTED CABLE INTERCONNECTION

(75) Inventor: Yasuo Hidaka, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 11/166,419

(22) Filed: Jun. 24, 2005

(65) Prior Publication Data
US 2006/0291457 A1    Dec. 28, 2006

(51) Int. Cl.
*H04J 15/00*   (2006.01)
*H04L 12/26*   (2006.01)
*H04B 1/44*    (2006.01)

(52) U.S. Cl. .................. 370/200; 370/252; 370/282

(58) Field of Classification Search ............... 370/201, 370/252, 254, 272–275, 282, 293
See application file for complete search history.

(56) References Cited

U.S. PATENT DOCUMENTS

| | | | |
|---|---|---|---|
| 5,327,433 A * | 7/1994 | Hall | 370/384 |
| 5,410,535 A | 4/1995 | Yang et al. | 370/13 |
| 5,432,505 A | 7/1995 | Wise | 340/825.06 |
| 5,515,037 A | 5/1996 | Wise | 340/825.79 |
| 5,577,023 A * | 11/1996 | Marum et al. | 370/225 |
| 6,272,552 B1 | 8/2001 | Melvin et al. | 709/250 |
| 6,625,144 B1 | 9/2003 | El-Batal et al. | 370/364 |
| 6,678,473 B1 * | 1/2004 | Morthier | 398/56 |
| 6,766,022 B1 * | 7/2004 | Bartolutti et al. | 379/413.02 |
| 6,865,231 B1 | 3/2005 | Bunton et al. | 375/246 |
| 7,203,306 B2 * | 4/2007 | Bain et al. | 379/306 |
| 2005/0092505 A1 * | 5/2005 | Mendoza | 174/50 |

\* cited by examiner

*Primary Examiner*—Hong Sol Cho
(74) *Attorney, Agent, or Firm*—Baker Botts L.L.P.

(57) ABSTRACT

A network system includes a cross-connected cable assembly interconnecting two or more network elements. The cross-connected cable assembly enables reduction in the effects of near-end crosstalk. Network elements may support separate gain adjustments for individual ports to further enhance the effectiveness of cross-connected ports.

16 Claims, 2 Drawing Sheets

CROSS-CONNECTED CABLE INTERCONNECTION

TECHNICAL FIELD OF THE INVENTION

The present invention relates generally to network cable interconnections and, more particularly, to cross-connected cable interconnections.

BACKGROUND OF THE INVENTION

In communication systems, physical cables typically connect between communication elements. These cables often suffer from various types of interference, such as near-end crosstalk and inter-symbol-interference due to attenuation of signal. This interference can seriously degrade signals and potentially disrupt communications.

SUMMARY OF THE INVENTION

In accordance with the present invention, techniques for cross-connected cable interconnection are provided.

According to a particular embodiment, a cross-connected cable for transporting electrical communications comprises a multiple-signal cable connecting network elements. Any number of network elements may have port by port amplification control, where the outgoing signal closest to incoming signals at one end of the cable is farthest to the opposite directional signals at the other end of the cable and is set to a smaller amplitude than other signals.

Embodiments of the invention provide various technical advantages. These techniques can provide physical cabling that can reduce the effects of near-end crosstalk at the expense of increased far-end crosstalk. Increased far-end crosstalk can be acceptable, since far-end crosstalk may be less severe than near-end crosstalk. Used in conjunction with two network elements having port by port amplification control, cross-connected cabling may provide even further benefits with respect to cable interference. When appropriately implemented, embodiments may provide cables that support high speed communications while resisting the effects of near-end crosstalk and inter-symbol-interference. Moreover, various embodiments may permit relatively compact connector assemblies that resist the effects of interference.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
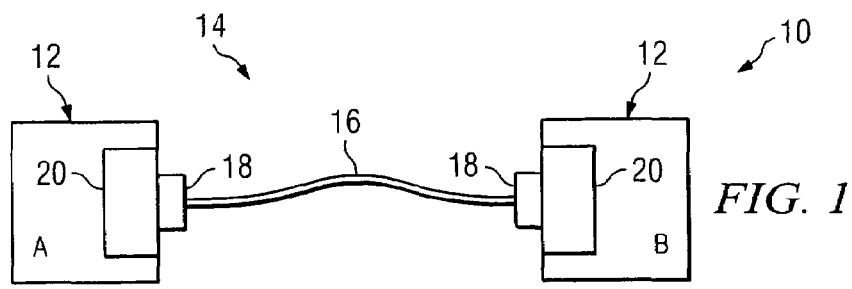
FIG. 1 illustrates a communication system including network elements interconnected by a cross-connected cable in accordance with various embodiments of the present invention.

FIG. 1 illustrates a communication system, indicated generally at 10, that includes network elements 12 interconnected by a cross-connected cable assembly 14. Cable assembly 14 includes a cable span 16 and connectors 18. Connectors 18 of cable assembly 14 physically couple to communication modules 20 within network elements 12. In general, cable assembly 14 provides cross-connections to reduce the effects of interference and enable high speed communications. In addition, communication modules 20 within network elements 12 may provide tuning of individual port amplifiers to work in conjunction with cable assembly 14 in reducing interference.

Network elements 12 each represent network communications equipment, including appropriate controlling logic. For example, network elements 12 may include switches, routers, gateways, or other suitable network equipment. According to particular embodiments, network elements 12 communicate with each other by way of high speed electrical signals.

Cable assembly 14 represents physical media capable of transporting electrical signals. According to particular embodiments, cable assembly 14 includes multiple individual lines. For example, cable assembly 14 may include multiple lines for transporting communications from network element 12 labeled A (network element A) to network element 12 labeled B (network element B), and multiple lines for transporting communications from network element B to network element A.

Connectors 18 provide for the coupling of cable assembly 14 with network elements 12. The particular shape and configuration of connectors 18 may be dictated by the corresponding inputs and outputs of network elements 12. That is, connectors 18 should be shaped to mate with corresponding inputs and outputs of network elements 12. According to particular embodiments, connectors 18 each have a number of plugs corresponding to ports in network element 12. For example, connectors 18 may each have a number of transmission plugs for coupling to transmission ports and a number of receive plugs for coupling to receive ports. These plugs may be arranged, for example, in a line such that each transmission plug is a consecutively greater distance from the receive plugs. However, this does not require that the spacing be regular or that all plugs within the connector be along a precise line or a single line. Thus connectors 18 should be understood to encompass any suitable configuration capable of providing a physical interconnection between cable span 16 and network elements 12. For example, connector 18 may be bare connections of wires, a connector assembly designed in accordance with particular standards, a custom configured connector assembly, or any other suitable configuration.

Figure 2:
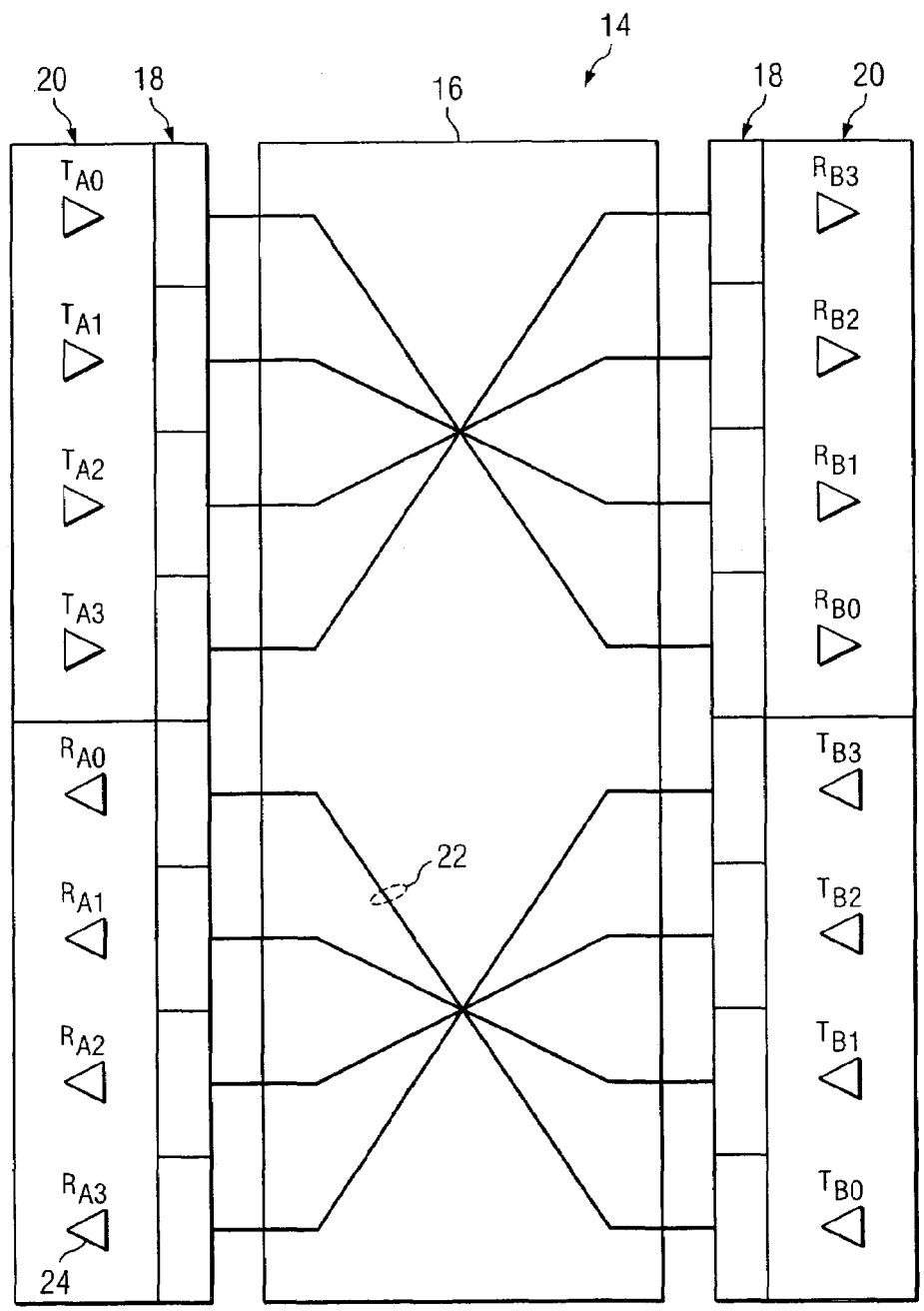
FIG. 2 illustrates the example interconnection of ports between two network elements.

FIG. 2 is a block diagram illustrating in greater detail the interconnection of network elements 12 by an example cable assembly 14. In the illustrated embodiment, cable span 16 includes a number of individual lines 22. Moreover, in the illustrated communication modules 20, network elements 12 include a number of amplifiers 24. As shown, cable assembly 14 includes four lines 22 for transmitting in one direction and four lines 22 for transmitting in the opposite direction. Each line 22 represents a logical signal to transmit information. For example, if differential signaling is used, each line 22 may comprise physically a pair of electrical signals. For ease of understanding, amplifiers 24 in each of network elements 12 are labeled according to a common scheme. Amplifiers 24 arranged to provide pre-emphasis of signals are labeled with a T for transmitter. Those amplifiers configured to provide post-emphasis of received signals are labeled with an R for receiver. In subscript, each amplifier is further designated based upon its placement within network element A or network element B and with respect to the particular channel on which the amplifier operates. Thus, for example, amplifier 24 labeled $T_{A0}$ connects via line 22 with amplifier 24 in network element B labeled $R_{B0}$.

As may be seen from this illustration, if the actual physical configuration of connector 18 and amplifiers 20 resembles the configuration illustrated, the cross-connection of line 22 may help to reduce the effects of near-end crosstalk within cable assembly 14. For example, consider a signal transmitted from amplifier $T_{A0}$ for receipt by amplifier $R_{B0}$. Amplifier $T_{A0}$ may provide a relatively large amplification of this signal and, because of the physical separation between amplifier $T_{A0}$ and the receiver amplifiers 24 ($R_{A0}$, $R_{A1}$, $R_{A2}$, $R_{A3}$), this relatively large amplification may impose only limited near-end crosstalk within network element A. Moreover, because of the relatively large amplification provided by amplifier $T_{A0}$, amplifier $R_{B0}$ may need little amplification to recover the received signal.

Consider next the example of a transmission from amplifier $T_{A3}$ to receiver $R_{B3}$. In this instance, a relatively large amplification may impose near-end crosstalk on receiver amplifiers 24 within network element A. Specifically, because of the close physical proximity of amplifier $T_{A3}$ with receiver amplifiers 24, a relatively large amplification of the transmitted signal may degrade the quality of signals received by receiver amplifiers $R_{A0}$, $R_{A1}$, $R_{A2}$, and/or $R_{A3}$. Therefore, amplifier $T_{A3}$ may use a relatively low amplification level. At the far-end, in network element B, amplifier $R_{B3}$ may apply a relatively large gain in order to appropriately recover the received signal having only low amplification within amplifier $T_{A3}$. At the receiving end, the large amplification of the received signal within amplifier $R_{B3}$ will likely pick up little near-end crosstalk within network element B due to the physical configuration at the receiving end. That is, if amplifier $R_{B3}$ is physically configured as the most distant amplifier from transmitter amplifiers 24 ($T_{B0}$, $T_{B1}$, $T_{B2}$, $T_{B3}$) then amplifier $R_{B3}$ may provide a relatively large amplification without picking up significant near-end crosstalk from the transmitter amplifiers 24 within network element B.

Differentiating amplitude of transmitted signals may make far-end crosstalk worse. In the above description, since the amplifier $T_{A0}$ has larger amplitude than the amplifier $T_{A3}$, the receiver amplifier $R_{B3}$ may see more far-end crosstalk than $R_{B0}$ and also than the case that $T_{A0}$ and $T_{A3}$ have same amplitude. Therefore, the reduction of near-end crosstalk in the above description is actually done at the expense of increased far-end crosstalk. Regardless of such increase in far-end crosstalk, reduction of near-end crosstalk may still be advantageous, since near-end crosstalk can be more severe than far-end crosstalk.

According to particular embodiments, amplifiers 24 may amplify different frequencies of signals at different gains. For example, because insertion loss along lines 22 may affect high frequencies more severely than low frequencies, amplifiers 24 may apply a higher amplification to high frequency components of signals as compared with low frequency components of those signals. High frequency usually refers to the Nyquist frequency which is half of the bit rate, and low frequency refers from DC to ⅕ of the high frequency depending on the signaling scheme such as scrambling or 8B10B. For instance, if the bit rate is 10 Gbps, the high frequency refers 5 GHz, and low frequency refers from DC to 1 GHz.

As can be seen by these relatively straightforward examples, the amplification levels applied across transmitting ports can be scaled to reduce the effects of near-end crosstalk between elements in relatively close physical proximity. Similarly, on the receiving end, the amplification of ports may be similarly scaled to reduce the inadvertent amplification of interference on the receiving end. However while this figure and the preceding discussion addresses a particular configuration having a specific number of lines 22 interconnecting network elements 12, it should be understood that the present concepts encompass any suitable cross-connection of lines within cable assemblies, with this cross-connection of lines potentially coupled with tunable transmitters and/or receivers. Moreover, while network elements 12 are illustrated as including communication modules 20 having particular elements, it should be understood that system 10 contemplates network elements 12 having any suitable combination and arrangement of elements supporting communications.

The above technique to differentiate amplitude of transmitted signals can be applied to either one side or both sides of the cable.

An advantage of applying amplitude control to one side is that systems can use an off-the-shelf component without capability of port to port amplitude control in the other side. In the above example, even if $T_{B0}$ through $T_{B3}$ have a similar amplitude, controlled amplitude at $T_{A0}$ through $T_{A3}$ reduces near-end crosstalk in both directions of the signal. Namely, reduced amplitude of $T_{A3}$ reduces the near-end crosstalk received by $R_{A0}$, and increased amplitude of $T_{A0}$ makes received signal at $R_{B0}$ more immune to the near-end crosstalk from $T_{B3}$, thus effectively reducing the near-end crosstalk. Hence, the effect of near-end crosstalk is reduced in both directions by controlling transmitted amplitude at only one side.

On the other hand, an advantage of applying the amplitude control to both sides is that the effect of reducing near-end crosstalk can be doubled.

Figure 3:
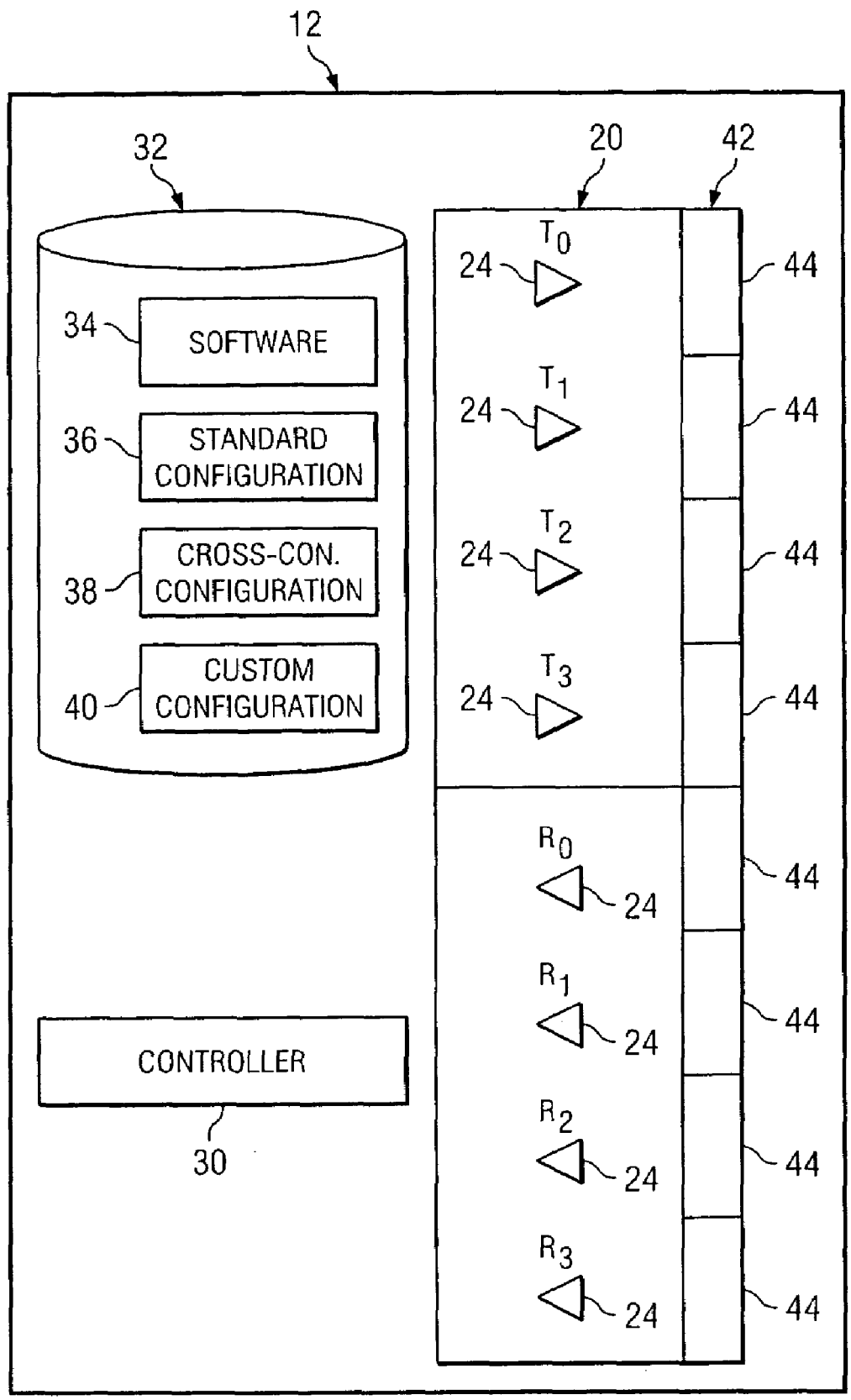
FIG. 3 illustrates an example network element from the system of FIG. 1.

FIG. 3 is a block diagram illustrating exemplary functional elements for network element 12. As illustrated, network element 12 includes communication module 20, a controller 30, and a memory 32. In general, the modules within network element 12 interact to support network communications. More specifically, the modules within network element 12 may operate to support cross-connected interconnections between communication module 20 and other network elements 12.

Controller 30 represents hardware, including any suitable controlling logic, capable of managing the operation of other modules within network element 12. For example, controller 30 may include one or more microprocessors or other suitable equipment capable of controlling the operation of network element 12. Furthermore, controller 30 may operate to load and execute software or other controlling logic from memory 32 or other suitable sources.

Memory 32 represents any suitable collection and arrangement of local or remote devices capable of maintaining information for use by other elements within network element 12. In the embodiment illustrated, memory 32 maintains software 34, standard configurations 36, cross-connected configurations 38, and custom configurations 40. Software 34 represents any suitable applications or logic routines capable when executed of controlling the operation of network element 12. For example, software 34 may include logic routines to be loaded and executed by controller 30. Standard configurations 36 represent settings for controlling the pre-emphasis and post-emphasis of transmitted and received signals within communication module 20 for use when network element 12 interconnects with another remote network element 12 using a standard cable assembly. Cross-connected configurations 38 include similar settings for communication module 20, but for use when network element 12 connects with another remote network element 12 using a cross-connected cable assembly. Custom configurations 40 include settings for communication module 12 customized for particular modes of operation. For example, custom configurations 40 may include dynamically adjusted settings, while standard configurations 36 and cross-connected configurations 38 include default settings.

Communication module 20 represents hardware, including appropriate controlling logic, capable of interconnecting with remote network equipment and transmitting and receiving electrical communication signals. In the embodiment illustrated, communication module 20 includes amplifiers 24 and a physical coupling 42 that includes a number of ports 44. Physical coupling 42 operates to interconnect communication module 20 with network cabling or other suitable interconnection media. According to particular embodiments, physical coupling 42 may mate with connector 18 of cable assembly 14.

In the embodiment illustrated, similar to the embodiments shown in FIG. 2, communication module 20 includes a number of transmitter amplifiers 24 and receiver amplifiers 24. According to particular embodiments, amplifiers 24 may be separately adjusted to independently control gain for each transmit and receive port 44 of network element 12. Thus, as previously discussed, transmitter amplifiers 24 and receiver amplifiers 24 may be independently adjusted to operate with a cross-connected cable assembly to reduce the effects of crosstalk.

To support various standard and cross-connected cables, communication module 20 may permit reconfigurations of the mapping of ports 44. For example, when interconnected using a standard cable, ports 44 may be mapped in one configuration, whereas when network element 12 interconnects using a cross-connected cable, the mapping of ports 44 may be inverted. According to particular embodiments, network element 12 may provide for the auto detection of cross-connected cables and the automatic mapping of ports 44 to support cross-connection. However, system 10 contemplates network element 12 using any suitable automatic or manual techniques for detecting the type of cabling used for interconnections. For example, two network elements 12 may communicate during an auto detection phase to discover whether a standard or cross-connected cable has been used.

During operation, network element 12 may adjust the gain of amplifiers 24 based on the network cabling used to interconnect network element 12 with remote network equipment. Considering again the example of network element 12 interconnecting using cross-connected cable assembly 14, communication module 20 may use a relatively high gain for amplifier $T_0$ with respectively lower gains used for amplifiers $T_1$, $T_2$, and $T_3$. Similarly, communication module 20 may use a relatively low post-emphasis gain for amplifier $R_0$, while using respectively higher amplifications for post-emphasis within amplifiers $R_1$, $R_2$, and $R_3$. However, as previously discussed, system 10 contemplates network element 12 using any suitable settings within elements of communication module 20 to work in combination with cross-connected network cabling.

While the embodiment illustrated and the preceding description focus on a particular embodiment of network element 12 that includes specific modules, system 10 contemplates network element 12 having any suitable combination and arrangement of elements for supporting network communications using cross-connected cable assemblies. Therefore, the modules and functionalities described may be separated or combined as appropriate, and some or all of the functionalities of network element 12 may be performed by logic encoded in media, such as software and/or programmed logic devices. Furthermore, while only particular modules of network element 12 are illustrated, it should be understood that network element 12 may include any number and type of modules for performing various networking functions.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A communication system comprising:
   a first network element and a second network element, each of the network elements comprising:
   a plurality of transmission ports;
   a plurality of receive ports, wherein the receive ports are spaced at consecutively greater physical distances from the transmission ports, and wherein the transmission ports are spaced at consecutively greater physical distances from the receive ports; and
   a controller operable to set pre-emphasis gain for each of the transmission ports and to set post-emphasis gain for each of the receive ports; and
   a cross-connected cable assembly electrically interconnecting the first network element and the second network element, the cross-connected cable assembly comprising:
   a first connector having a plurality of transmission plugs and a plurality of receive plugs arranged to mate with corresponding transmission ports and receive ports of the first network element;
   a second connector having a plurality of transmission plugs and a plurality of receive plugs arranged to mate with corresponding transmission ports and receive ports of the second network element;
   a first plurality of lines each capable of transporting electrical communications, each of the first plurality of lines having a first end connecting to one of the transmission plugs of the first connector and a second end connecting to one of the receive plugs of the second connector, such that an ordering of connections of the first ends with respect to the receive plugs of the first connector is inverted as compared to an ordering of connections of the second ends with respect to the transmission plugs of the second connector; and
   a second plurality of lines each capable of transporting electrical communications, each of the second plurality of lines having a first end connecting to one of the receive plugs of the first connector and a second end connecting to one of the transmission plugs of the second connector, such that an ordering of connections of the first ends with respect to the transmission plugs of the first connector is inverted as compared to an ordering of connections of the second ends with respect to the receive plugs of the second connector.

2. The communication system of claim 1, wherein for each of the network elements, each of the transmission ports applies a larger pre-emphasis gain as compared with others of the transmission ports having a smaller physical distance to the receive ports.

3. The communication system of claim 1, wherein for each of the network elements, each of the receive ports applies a larger post-emphasis gain as compared with others of the receive ports having a smaller physical distance to the transmission ports.

4. The communication system of claim 1, wherein for each of the network elements, each of the transmission ports applies a specific pre-emphasis gain to outgoing signals, wherein the specific pre-emphasis gain amplifies high-frequency components of the outgoing signals more than low-frequency components of the outgoing signals.

5. The communication system of claim 1, wherein, for each of the first connector and the second connector, a physical distance between each adjacent pair of transmission plugs is substantially equal, and a physical distance between each adjacent pair of receive plugs is substantially equal.

6. The communication system of claim 1, wherein, for each of the first plurality of lines, a sum of a physical distance of the first end with respect to the receive plugs of the first connector and a physical distance of the second end with respect to the transmission plugs of the second connector is substantially equal to a similar sum for the other ones of the first plurality of lines.

7. The communication system of claim 1, wherein each of the network elements further comprises:
   a plurality of tunable transmission amplifiers each configured to apply a selected pre-emphasis gain to signals for transmission on a corresponding one of the transmission ports; and
   a plurality of tunable receive amplifiers each configured to apply a selected post-emphasis gain to signals received on a corresponding one of the receive ports.

8. A cross-connected network cable assembly comprising:
   a first connector having a plurality of transmission plugs and a plurality of receive plugs, wherein the transmission plugs are spaced at consecutively greater physical distances from the receive plugs, and the receive plugs are spaced at consecutively greater physical distances from the transmission plugs;
   a second connector having a plurality of transmission plugs and a plurality of receive plugs, wherein the transmission plugs are spaced at consecutively greater physical distances from the receive plugs, and the receive plugs are spaced at consecutively greater physical distances from the transmission plugs;
   a first plurality of lines each capable of transporting electrical communications, each of the first plurality of lines having a first end connecting to one of the transmission plugs of the first connector and a second end connecting to one of the receive plugs of the second connector, such that an ordering of connections of the first ends with respect to the receive plugs of the first connector is inverted as compared to an ordering of connections of the second ends with respect to the transmission plugs of the second connector; and
   a second plurality of lines each capable of transporting electrical communications, each of the second plurality of lines having a first end connecting to one of the receive plugs of the first connector and a second end connecting to one of the transmission plugs of the second connector, such that an ordering of connections of the first ends with respect to the transmission plugs of the first connector is inverted as compared to an ordering of connections of the second ends with respect to the receive plugs of the second connector.

9. The cross-connected network cable assembly of claim 8, wherein, for each of the first connector and the second connector, a physical distance between each adjacent pair of transmission plugs is substantially equal, and a physical distance between each adjacent pair of receive plugs is substantially equal.

10. The cross-connected network cable assembly of claim 8, wherein, for each of the first plurality of lines, a sum of a physical distance of the first end with respect to the receive plugs of the first connector and a physical distance of the second end with respect to the transmission plugs of the second connector is substantially equal to a similar sum for the other ones of the first plurality of lines.

11. A network element comprising:
    a communication module comprising a plurality of transmission ports and a plurality of receive ports, wherein the receive ports are spaced at consecutively greater physical distances from the transmission ports, and wherein the transmission ports are spaced at consecutively greater physical distances from the receive ports, wherein the communication module is capable of operating in a selected one of a first configuration and a second configuration, wherein the second configuration inverts a mapping of the transmission ports and a mapping of the receive ports as compared to the first configuration; and
    a controller operable to set pre-emphasis gain for each of the transmission ports and to set post-emphasis gain for each of the receive ports, wherein the controller is further operable to select between the first configuration and the second configuration of the communication module.

12. The network element of claim 11, wherein the controller is further operable to detect a connection of a cross-connected cable assembly to the communication module and, in response, to select the second configuration of the communication module.

13. The network element of claim 11, wherein in the second configuration, each of the transmission ports applies a larger pre-emphasis gain as compared with others of the transmission ports having a smaller physical distance to the receive ports.

14. The network element of claim 11, wherein in the second configuration, each of the receive ports applies a larger post-emphasis gain as compared with others of the receive ports having a smaller physical distance to the transmission ports.

15. The network element of claim 11, wherein each of the transmission ports applies a specific pre-emphasis gain to outgoing signals, wherein the specific pre-emphasis gain amplifies high-frequency components of the outgoing signals more than low-frequency components of the outgoing signals.

16. The network element of claim 11, wherein the communication module further comprises:
    a plurality of tunable transmission amplifiers each configured to apply a selected pre-emphasis gain to signals for transmission on a corresponding one of the transmission ports; and
    a plurality of tunable receive amplifiers each configured to apply a selected post-emphasis gain to signals received on a corresponding one of the receive ports.

* * * * *